United States Patent
Sakurai et al.

(10) Patent No.: US 9,414,089 B2
(45) Date of Patent: *Aug. 9, 2016

(54) IMAGE PROCESSING APPARATUS AND IMAGE PROCESSING METHOD

(71) Applicant: SONY CORPORATION, Tokyo (JP)

(72) Inventors: Hironari Sakurai, Tokyo (JP); Junichi Tanaka, Tokyo (JP); Kazushi Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,190

(22) Filed: Jan. 4, 2016

(65) Prior Publication Data

US 2016/0119644 A1    Apr. 28, 2016

Related U.S. Application Data

(63) Continuation of application No. 13/888,006, filed on May 6, 2013, now Pat. No. 9,264,714, which is a continuation of application No. 12/792,509, filed on Jun. 2, 2010, now Pat. No. 8,472,741.

(30) Foreign Application Priority Data

Jun. 11, 2009  (JP) ................................ 2009-140368

(51) Int. Cl.
| | |
|---|---|
| H04N 19/00 | (2014.01) |
| H04N 19/61 | (2014.01) |
| H04N 19/625 | (2014.01) |
| H04N 19/119 | (2014.01) |
| H04N 19/122 | (2014.01) |
| H04N 19/176 | (2014.01) |
| H04N 21/84 | (2011.01) |
| H04N 21/482 | (2011.01) |
| H04N 21/45 | (2011.01) |

(52) U.S. Cl.
CPC ............ *H04N 19/61* (2014.11); *H04N 19/119* (2014.11); *H04N 19/122* (2014.11); *H04N 19/176* (2014.11); *H04N 19/625* (2014.11); *H04N 21/4532* (2013.01); *H04N 21/4821* (2013.01); *H04N 21/84* (2013.01)

(58) Field of Classification Search
None
See application file for complete search history.

(56) References Cited

U.S. PATENT DOCUMENTS

| 5,241,395 A * | 8/1993 | Chen .................... H04N 19/176 358/426.14 |
|---|---|---|
| 6,263,313 B1 * | 7/2001 | Milsted .................. G06F 21/10 341/51 |
| 6,345,256 B1 * | 2/2002 | Milsted .................. G06F 21/10 705/64 |
| 8,472,741 B2 * | 6/2013 | Sakurai .................. H04N 5/775 382/190 |
| 9,264,714 B2 * | 2/2016 | Sakurai .................. H04N 5/775 |
| 2007/0041447 A1 * | 2/2007 | Burazerovic ...... G06F 17/30814 375/240.18 |
| 2008/0232783 A1 * | 9/2008 | Boston .................... H04N 5/76 386/292 |
| 2010/0315555 A1 * | 12/2010 | Sakurai .................... H04N 5/21 348/563 |

* cited by examiner

*Primary Examiner* — Bernard Krasnic

(74) *Attorney, Agent, or Firm* — Chip Law Group

(57) ABSTRACT

An image processing apparatus includes a receiving unit configured to receive image data of program content and genre information relating to the program content, a selection unit configured to select a size selection parameter for causing the genre information received by the receiving unit to be reflected in a block size, a determination unit configured to determine a block size in accordance with the size selection parameter selected by the selection unit, the block size being used for orthogonal transformation, and an orthogonal transformation unit configured to perform orthogonal transformation on the image data received by the receiving unit at the block size determined by the determination unit.

20 Claims, 9 Drawing Sheets

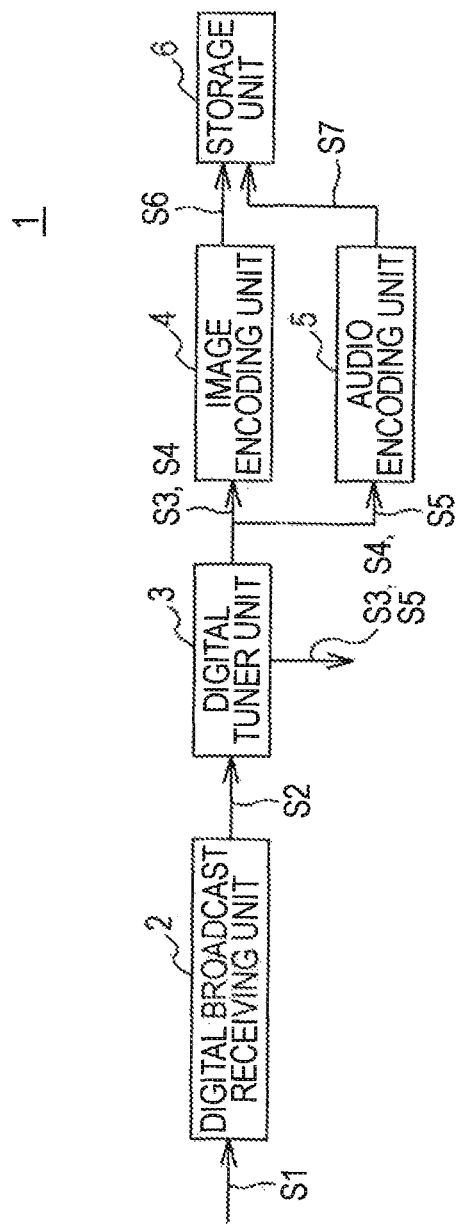

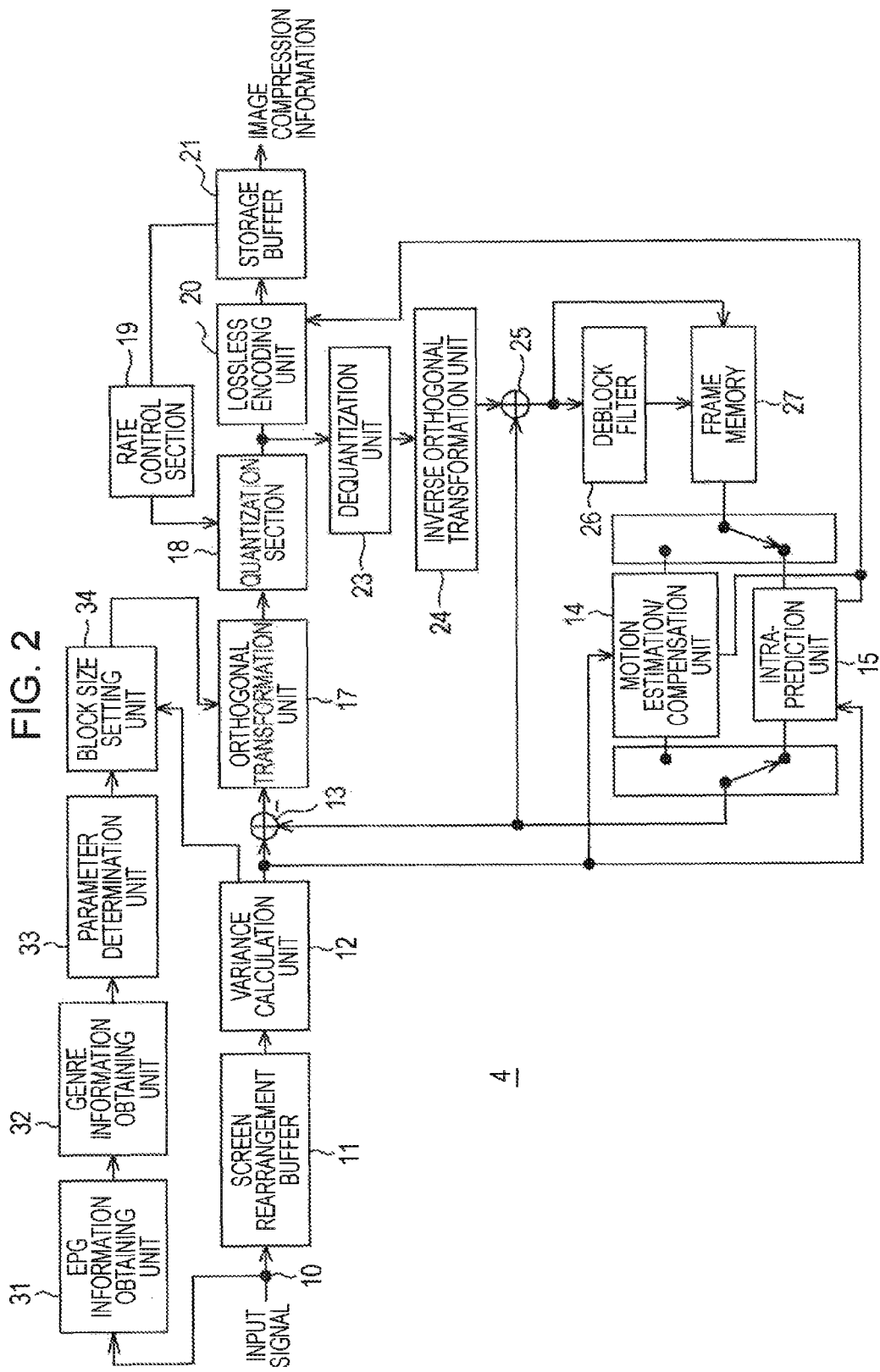

| 4 × 4 PRIORITY ELEMENT | TEXTURE | MOTION | GRADATION | TOTAL SCORE | SIZE SELECTION PARAMETER | OFFSET |
|---|---|---|---|---|---|---|
| WEIGHT | (7) | (7) | (5) | | | |
| NEWS/NEWS REPORT | 4 | 4 | 3 | 11 | DEFAULT | 0 |
| SPORTS | 4 | 7 | 3 | 14 | 4 × 4 PREFERENTIAL | -1000 |
| ENTERTAINMENT & GOSSIP | 4 | 4 | 3 | 11 | DEFAULT | 0 |
| DRAMA | 4 | 4 | 3 | 11 | DEFAULT | 0 |
| MUSIC | 4 | 7 | 3 | 14 | 4 × 4 PREFERENTIAL | -1000 |
| VARIETY | 4 | 6 | 3 | 13 | 4 × 4 PREFERENTIAL | -1000 |
| MOVIE | 4 | 4 | 1 | 9 | 8 × 8 PREFERENTIAL | +1000 |
| ANIMATION/SFX | 7 | 4 | 3 | 14 | 4 × 4 PREFERENTIAL | -1000 |
| DOCUMENTARY/EDUCATION | 1 | 3 | 2 | 6 | 8 × 8 PREFERENTIAL | +1000 |
| THEATER/STAGE | 4 | 4 | 3 | 11 | DEFAULT | 0 |
| HOBBY/EDUCATION | 3 | 2 | 3 | 8 | 8 × 8 PREFERENTIAL | +1000 |
| WELFARE | 4 | 4 | 3 | 11 | DEFAULT | 0 |

FIG. 5

| 4 × 4-PRIORITY ELEMENT | DCT_TH |
|---|---|
| NEWS/NEWS REPORT | 2000 |
| SPORTS | 1000 |
| ENTERTAINMENT & GOSSIP | 2000 |
| DRAMA | 2000 |
| MUSIC | 1000 |
| VARIETY | 1000 |
| MOVIE | 3000 |
| ANIMATION/SFX | 1000 |
| DOCUMENTARY/EDUCATION | 3000 |
| THEATER/STAGE | 2000 |
| HOBBY/EDUCATION | 3000 |
| WELFARE | 2000 |

FIG. 7

| TYPE | | CONTENT | ADDITIONAL COEFFICIENT | CONDITION OF APPLICATION |
|---|---|---|---|---|
| BROADCAST STATION INFORMATION | | H | 0.9 | |
| | | F | 1.1 | |
| FEATURE KEYWORDS | | LIVE BROADCASTING SPORTS | 1.2 | NOT SAME GENRE INFORMATION |
| | | NAME OF NATURE SPOT | 0.8 | NOT DOCUMENTARY/EDUCATION GENRE |

FIG. 8

| PRIMARY CLASSIFICATION | EXCEPTIONAL SUB-CLASSIFICATION | TEXTURE (7) | MOTION (7) | GRADATION (5) | TOTAL SCORE | SIZE SELECTION THRESHOLD | OFFSET |
|---|---|---|---|---|---|---|---|
| NEWS/NEWS REPORT | POLITICS & CONGRESS/ DEBATE & CONFERENCE | 4 | 1 | 3 | 8 | 8 × 8 PREFERENTIAL | +1000 |
| ENTERTAINMENT & GOSSIP | LIFESTYLE/FOOD & COOKING/ HEALTH & MEDICINE | 4 | 1 | 3 | 8 | 8 × 8 PREFERENTIAL | +1000 |
| MUSIC | CLASSICS & OPERA | 4 | 2 | 3 | 9 | 8 × 8 PREFERENTIAL | +1000 |
| VARIETY | TRAVEL & TOUR | 2 | 2 | 3 | 7 | 8 × 8 PREFERENTIAL | +1000 |
| MOVIE | ANIMATION | 7 | 4 | 3 | 14 | 4 × 4 PREFERENTIAL | -1000 |
| ANIMATION/SFX | SFX | 4 | 3 | 3 | 10 | 8 × 8 PREFERENTIAL | +1000 |
| DOCUMENTARY/ EDUCATION | SPORTS | 4 | 7 | 3 | 14 | 4 × 4 PREFERENTIAL | -1000 |
| | HISTORICAL & TRAVEL/ INTERVIEW & DISCUSSION | 4 | 1 | 3 | 8 | 8 × 8 PREFERENTIAL | +1000 |
| THEATER/STAGE | DANCE & BALLET | 4 | 7 | 3 | 14 | 4 × 4 PREFERENTIAL | -1000 |
| | COMEDY & SITCOM | 4 | 1 | 3 | 8 | 8 × 8 PREFERENTIAL | +1000 |

IMAGE PROCESSING APPARATUS AND IMAGE PROCESSING METHOD

REFERENCE

The present application is a continuation application of U.S. patent application Ser. No. 13/888,006 filed on May 6, 2013, which is a continuation application of U.S. patent application Ser. No. 12/792,509 filed on Jun. 2, 2010, which claims priority to and benefit from Japanese Priority Patent Application JP 2009-140368 filed in the Japan Patent Office on Jun. 11, 2009. The entire contents of each of which are incorporated herein by reference.

BACKGROUND OF THE INVENTION

1. Field of the Invention

The present invention relates to an image processing apparatus and an image processing method, which are suitable for use in, for example, encoding apparatuses operable to encode image data distributed via terrestrial digital broadcasting.

2. Description of the Related Art

In general, there are widely available image processing apparatuses configured to encode broadcast program content distributed via terrestrial digital broadcasting or the like and to store the encoded content in a disk such as a hard disk or an optical disk. Examples of the image processing apparatuses include a hard disk recorder and a Blu-ray Disc (registered trademark) recorder.

Broadcast program content viewed by the audience and information about the broadcast program content (hereinafter referred to as "EPG information") are distributed via terrestrial digital broadcasting. The EPG information includes the description and keywords of the broadcast program content, broadcast schedules, and genre information indicating the genre of the broadcast program content.

One of such image processing apparatuses is configured such that broadcast program content that is stored in the image processing apparatus and that is not reproduced for a certain period of time is stored again at a higher compression ratio (see, for example, Japanese Unexamined Patent Application Publication No. 2009-10603). In this image processing apparatus, a compression ratio and the timing of storage at a compression ratio higher than the compression ratio are selected in accordance with the genre information.

SUMMARY OF THE INVENTION

Genre information is classified in accordance with the description of broadcast program content. Depending on the broadcast program content, features of image data may change. Thus, an image processing apparatus may more efficiently use genre information to encode image data.

Therefore, it is desirable to provide an image processing apparatus and an image processing method which enable improvement in image quality.

In an embodiment of the present invention, an image processing apparatus includes a receiving unit configured to receive image data of program content and genre information relating to the program content, a selection unit configured to select a size selection parameter for causing the genre information received by the receiving unit to be reflected in a block size, a determination unit configured to determine a block size in accordance with the size selection parameter selected by the selection unit, the block size being used for orthogonal transformation, and an orthogonal transformation unit configured to perform orthogonal transformation on the image data received by the receiving unit at the block size determined by the determination unit.

Thus, the image processing apparatus can cause broadcast program content to be reflected in a block size, thereby appropriately set a block size.

In another embodiment of the present invention, an image processing method includes the steps of receiving image data of program content and genre information relating to the program content; selecting a size selection parameter for causing the genre information received in the step of receiving to be reflected in a block size; determining a block size in accordance with the size selection parameter selected in the step of selecting, the block size being used for orthogonal transformation; and performing orthogonal transformation on the image data received in the step of receiving at the block size determined in the step of determining.

Thus, in the image processing method, broadcast program content can be reflected in a block size, and therefore a block size can be appropriately set.

According to an embodiment of the present invention, broadcast program content can be reflected in a block size, and thus a block size can be appropriately set. Therefore, an image processing apparatus and an image processing method which enable improvement in image quality can be achieved.

BRIEF DESCRIPTION OF THE DRAWINGS

FIG. 1 is a schematic diagram illustrating the configuration of an image processing apparatus;

FIG. 2 is a schematic diagram illustrating the configuration of an image encoding unit;

FIG. 4 is a schematic diagram describing determination of size selection parameters;

FIG. 5 is a schematic diagram illustrating a setting table;

FIG. 7 is a schematic diagram illustrating an additional coefficient table;

FIG. 8 is a schematic diagram describing exceptional size selection parameters according to another embodiment.

DESCRIPTION OF THE PREFERRED EMBODIMENTS

Figure 3A:
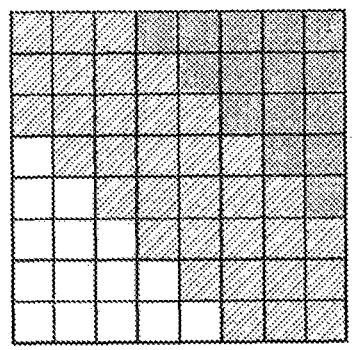
FIGS. 3A and 3B are schematic diagrams depicting variance and texture.

An embodiment of the present invention will be described in detail hereinafter with reference to the drawings. The description will be given in the following order:

1. First Embodiment (Change of DCT Block Size in accordance with Characteristics of Image)
2. Second Embodiment (Use of Other Information)
3. Other Embodiments 1. First Embodiment 1-1. Configuration of Image Processing Apparatus FIG. 1 illustrates an image processing apparatus 1. The image processing apparatus 1 may be a device configured to receive broadcast program content serving as program content and to store the received broadcast program content, such as a hard disk recorder or a personal computer.

A digital broadcasting receiving unit 2 may be, for example, an external interface connected to an antenna or a network such as the Internet and configured to receive a broadcast signal S1 such as a terrestrial digital broadcasting signal. The broadcast signal S1 may be, for example, a signal encoded according to the Moving Picture Experts Group 2 (MPEG-2) standard.

Upon receipt of the broadcast signal Si which represents broadcast program content, the digital broadcasting receiving unit 2 supplies the broadcast signal S1 to a digital tuner unit 3 as a broadcast signal S2. The digital tuner unit 3 decodes the broadcast signal S2 to generate Electric Program Guide (EPG) information S3, image data S4, and audio data S5, and supplies the EPG information S3, the image data S4, and the audio data S5 to, for example, a display apparatus (not illustrated) such as a television apparatus. The EPG information S3 may include the description and keywords of the broadcast program content, broadcast schedules, broadcast station information, event information, time information, genre information, and other suitable information.

Thus, an image based on the image data S4 is displayed on the display apparatus, and audio based on the audio data S5 is output. Further, various information in the EPG information S3 is displayed in response to a request from a user.

The digital tuner unit 3 supplies the EPG information S3 and the image data S4 to an image encoding unit 4, and supplies the audio data S5 to an audio encoding unit 5. The image encoding unit 4 performs an image encoding process, which will be described below, to encode the image data S4 in accordance with the H.264/Advanced Video Coding (AVC) scheme to generate a bit stream S6, and supplies the bit stream S6 to a storage unit 6.

The audio encoding unit 5 encodes the audio data S5 in accordance with a predetermined encoding scheme to generate encoded audio data S7, and supplies the encoded audio data S7 to the storage unit 6. The storage unit 6 may be, for example, an optical disk such as a hard disk or a Blu-ray Disc (registered trademark), a flash memory, or the like. The storage unit 6 stores the supplied bit stream S6 and encoded audio data S7 in association with each other.

Thus, an encoded version of the broadcast program content is stored in the storage unit 6. In response to a request from a user, the image processing apparatus 1 reads the broadcast program content stored in the storage unit 6, decodes the read broadcast program content using a decoding unit (not illustrated), and reproduces the image data S4 and the audio data S5. The decoding unit supplies the image data S4 and the audio data S5 to the display apparatus. Consequently, an image based on the image data S4 is displayed on the display apparatus, and audio based on the audio data S5 is output to the display apparatus.

1-2. Configuration of Image Encoding Unit

Referring to FIG. 2, when the EPG information S3 and the image data S4 are supplied to the image encoding unit 4 from the digital tuner unit 3 via an input terminal 10, the EPG information S3 is supplied to an EPG information obtaining unit 31 and the image data S4 is supplied to a screen rearrangement buffer 11.

The screen rearrangement buffer 11 rearranges the image data S4 in accordance with the Group Of Picture (GOP) structure in the image data S4, and supplies the rearranged image data S4 to a variance calculation unit 12. The variance calculation unit 12 calculates a variance value MB_Var of each macroblock, and supplies the variance value MB_Var to a block size setting unit 34. The variance calculation unit 12 supplies the supplied image data S4 to an arithmetic unit 13, a motion estimation/compensation unit 14, and an intra-prediction unit 15.

When the image data S4 is to be inter-encoded, the arithmetic unit 13 subtracts a predicted value L5, which is supplied from the motion estimation/compensation unit 14, from the image data S4, and supplies the difference therebetween to an orthogonal transformation unit 17 as difference data D1. When the image data S4 is to be intra-encoded, the arithmetic unit 13 subtracts a predicted value L5, which is supplied from the intra-prediction unit 15, from the image data S4, and supplies the difference therebetween to the orthogonal transformation unit 17 as difference data D1.

The orthogonal transformation unit 17 performs orthogonal transformation on the difference data D1 by performing a Discrete Cosine Transform (DCT) process, and supplies a DCT coefficient D2 to a quantization unit 18.

The quantization unit 18 quantizes the DCT coefficient D2 using a quantization parameter QP determined under the control of a rate control unit 19, and supplies a quantized coefficient D3 to a dequantization unit 23 and a lossless encoding unit 20. The lossless encoding unit 20 performs lossless encoding of the quantized coefficient D3 in accordance with entropy encoding such as Context-based Adaptive Variable Length Code (CAVLC) and Context Adaptive Binary Arithmetic Coding (CABAC), and supplies lossless encoded data D5 to a storage buffer 21.

The lossless encoding unit 20 obtains information about intra-encoding and inter-encoding from the motion estimation/compensation unit 14 and the intra-prediction unit 15, and sets the obtained information in header information of the lossless encoded data D5.

The storage buffer 21 stores the lossless encoded data D5, and also outputs the lossless encoded data D5 as the bit stream S6 at a predetermined transmission speed. The rate control unit 19 monitors the storage buffer 21, and determines the quantization parameter QP so that an amount of encoding generated for the lossless encoded data D5 can approach a certain amount of encoding in certain units of control (such as in units of frames or GOPs).

The dequantization unit 23 dequantizes the quantized coefficient D3 to generate a reproduced DCT coefficient L1, and supplies the reproduced DCT coefficient L1 to an inverse orthogonal transformation unit 24. The inverse orthogonal transformation unit 24 performs inverse orthogonal transformation on the reproduced DCT coefficient L1 to generate reproduced difference data L2, and supplies the reproduced difference data L2 to an arithmetic unit 25.

The arithmetic unit 25 sums the predicted value L5 supplied from the motion estimation/compensation unit 14 or the intra-prediction unit 15 and the reproduced difference data L2 to generate local decoded images L3 of blocks to be processed, and supplies the local decoded images L3 to a deblock filter 26 and a frame memory 27.

The deblock filter 26 executes a deblock filtering process on the blocks to be processed, and supplies results to the frame memory 27. Thus, deblock-filtered local decoded images L4 are stored in the frame memory 27.

The frame memory 27 supplies a local decoded image L4 corresponding to a reference block among the deblock-filtered local decoded images L4 to the motion estimation/compensation unit 14 or the intra-prediction unit 15. The motion estimation/compensation unit 14 performs motion estimation on the image data S4 by referring to the local decoded image L4 to generate a predicted value L5 for the blocks to be processed, and supplies the predicted value L5 to the arithmetic units 13 and 25. The intra-prediction unit 15 performs intra-prediction on the image data S4 by referring to the local decoded images L4 to generate a predicted value L5 for the blocks to be processed, and supplies the predicted value L5 to the arithmetic units 13 and 25.

Accordingly, the image encoding unit 4 is configured to encode the image data S4 and to generate the bit stream S6.

1-3. Block Size Setting Process

Next, a block size setting process will be described.

In the MPEG-2 scheme, DCT processing is performed using DCT blocks of 8×8 pixels. In the AVC/H.264 scheme, in contrast, DCT blocks of 4×4 pixels are employed in order to reduce mosquito noise or block noise. It is commonly understood that encoding efficiency can be reduced by DCT processing using DCT blocks of 4×4 pixels.

In the AVC/H.264 scheme, Fidelity Range Extension (FRExt), which was standardized as a profile for high-definition video in February 2005, enables switching between DCT blocks of 8×8 pixels and DCT blocks of 4×4 pixels on a macroblock-by-macroblock basis. The standardization of AVC/H.264 FRExt makes it possible to reduce mosquito noise or block noise without reducing encoding efficiency as much as possible.

Specifically, the image encoding unit 4 selects DCT blocks of 4×4 pixels or DCT blocks of 8×8 pixels on the basis of the variance value MB_Var of pixel values (for example, luminance values) in a macroblock in consideration of balance between noise reduction and encoding efficiency.

That is, when the variance value MB_Var is larger than a size selection threshold DCT_TH, the complexity of the image is high and the occurrence probability of noise is high. Thus, the image encoding unit 4 prioritizes noise reduction and selects DCT blocks of 4×4 pixels.

For the image data S4 for which the variance value MB_Var is less than or equal to the size selection threshold DCT_TH and for which mosquito noise or block noise is less likely to occur, the image encoding unit 4 prioritizes encoding efficiency and selects DCT blocks of 8×8 pixels.

Therefore, the image encoding unit 4 can reduce mosquito noise or block noise without reducing encoding efficiency as much as possible.

Figure 3B:
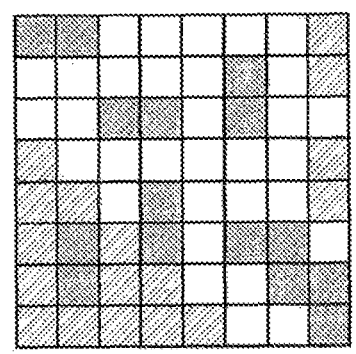

However, the variance value MB_Var may not necessarily fully represent the occurrence probability of mosquito noise or block noise. For example, as illustrated in FIGS. 3A and 3B, the occurrence probability of mosquito noise or block noise may differ even when the total number of luminance values that appear is the same. FIG. 3A illustrates a low-frequency image in which mosquito noise or block noise is less likely to occur. FIG. 3B, on the other hand, illustrates a high-frequency image in which mosquito noise or block noise is likely to occur.

Further, an image with a large amount of motion tends to include mosquito noise or block noise because a large amount of encoding for the difference data D1 is likely to occur and a large quantization parameter QP is used. However, it is difficult to recognize this tendency from the variance value MB_Var.

As described above, broadcast program content and EPG information are distributed via terrestrial digital broadcasting. The EPG information includes, in addition to broadcast schedule information and information indicating the description of the broadcast program content, genre information about the genre into which the broadcast program content is classified in accordance with the description the broadcast program content.

The genre information may indicate the features of the image data S4 for each broadcast program content. Thus, the image encoding unit 4 according to the present embodiment is configured to change the size selection threshold DCT_TH in accordance with the genre information, thereby switching between the priority of noise reduction or the priority of encoding efficiency in accordance with the description of the broadcast program content.

Specifically, the image encoding unit 4 prioritizes noise reduction for broadcast program content having textures (pictures) in which noise is likely to occur, and preferentially uses DCT blocks of 4×4 pixels. The image encoding unit 4 prioritizes encoding efficiency for broadcast program content having textures in which noise is less likely to occur, and preferentially uses DCT blocks of 8×8 pixels.

The image encoding unit 4 prioritizes noise reduction for genre information for which noise is likely to occur and for which the amount of motion is large, and preferentially uses DCT blocks of 4×4 pixels. The image encoding unit 4 prioritizes encoding efficiency for genre information for which noise is less likely to occur and for which the amount of motion is small, and preferentially uses DCT blocks of 8×8 pixels.

It is commonly understood that the use of DCT blocks of 8×8 pixels allows an increase in quality of gradation. The image encoding unit 4 prioritizes image quality for broadcast program content indicated by genre information for which the importance of gradation is high, and preferentially uses DCT blocks of 8×8 pixels.

As described above, the image encoding unit 4 selects DCT blocks of 4×4 pixels when the variance value MB_Var is larger than the size selection threshold DCT_TH, and selects DCT blocks of 8×8 pixels when the variance value MB_Var is less than or equal to the size selection threshold DCT_TH.

When preferentially using DCT blocks of 4×4 pixels, the image encoding unit 4 adds a negative offset OF (for example, "−1000") to the default value (for example, "2000") of the size selection threshold DCT_TH. Thus, the size selection threshold DCT_TH is reduced, and the image encoding unit 4 allows more frequent selection of DCT blocks of 4×4 pixels.

When preferentially using DCT blocks of 8×8 pixels, the image encoding unit 4 adds a positive offset OF (for example, "+1000") to the default value (for example, "2000") of the size selection threshold DCT_TH. Thus, the size selection threshold DCT_TH is increased, and the image encoding unit 4 allows more frequent selection of DCT blocks of 8×8 pixels.

FIG. 4 illustrates genre information and a list of size selection parameters associated with the genre information. In terrestrial digital broadcasting, broadcast program content is classified into 12 genres (called primary-classification genres). In the present embodiment, in accordance with the rule described above, 4×4-priority elements that represent the priority of DCT blocks of 4×4 pixels are given scores, and the respective offsets OF are determined in accordance with total scores. In the present embodiment, "texture", "motion", and "gradation" are provided as 4×4-priority elements. The higher the score, the higher the priority of noise reduction. In this case, DCT blocks of 4×4 pixels are prioritized.

Specifically, the 4×4-priority element "texture" represents the degree to which noise is likely to occur in accordance with the picture. The higher the occurrence probability of noise, the higher the score. A genre to which broadcast program content with a large amount of "motion" belongs has a high score because noise is likely to occur. The 4×4-priority element "gradation" represents the importance of gradation in the input image data S4. The higher the importance of gradation, the lower the score. This is because it is desirable that DCT blocks of 8×8 pixels be preferentially used.

The highest scores of the individual 4×4-priority elements are different (represented by bracketed numbers). That is, noise-priority elements are weighted in accordance with their importance.

When the total score obtained by summing the values of the respective 4×4-priority elements is high, noise reduction rather than encoding efficiency is prioritized, that is, DCT blocks of 4×4 pixels are more preferentially used. When the total score is low, on the other hand, encoding efficiency rather than noise reduction is prioritized, that is, DCT blocks of 8×8 pixels are more preferentially used.

In the present embodiment, an intermediate value may be taken when the total score is "11". When the total score is in the range of "10" to "12", the size selection parameter "default" may be selected, and the offset OF may be set to "0". When the total score is greater than or equal to "13", the size selection parameter "4×4 preferential" may be selected, and the offset OF may be set to "−1000". When the total score is less than or equal to "9", the size selection parameter "8×8 preferential" may be selected, and the offset OF may be set to "+1000".

Specifically, a news/news report genre includes images of various textures, such as images captured in studios and images captured outdoors such as in sites of events. Thus, the news/news report genre is evaluated as having an element "texture" of "4", which is an intermediate value. The news/news report genre further includes images with a large amount of motion such as sports and almost still images such as images of a newscaster reporting news, and is thus also evaluated as having an element "motion" of "4", which is an intermediate value. The news/news report genre has no importance on gradation, and is thus evaluated as having an element "gradation" of "3", which is an intermediate value. Consequently, the total score is "11", the size selection parameter "default" is selected, and the offset OF is set to "0".

A sports genre does not exhibit noticeable features, and is thus evaluated as having an element "texture" of "4", which is an intermediate value. Because of the significance of quick movements, the sports genre is evaluated as having an element "motion" of "7", which is the maximum value. Since gradation is not so important, the sports genre is evaluated as having an element "gradation" of "3", which is an intermediate value. Consequently, the total score is "14", the size selection parameter "4×4 preferential" is selected, and the offset OF is set to "−1000".

Like the news/news report genre, an entertainment & gossip genre is evaluated as having elements "texture", "motion", and "gradation" of "4", "4", and "3", respectively, which are intermediate values because of supply of various kinds of image data S4. In the entertainment & gossip genre, consequently, the total score is "11", the size selection parameter "default" is selected, and the offset OF is set to "0".

A drama genre has various types of dramas including, for example, dramas with a comparatively small amount of motion, such as romance dramas, and dramas with a large amount of motion, such as action dramas and sports dramas. Further, because of having no noticeable features in textures and no importance on gradation, the drama genre, like the news/news report genre, is evaluated as having elements "texture", "motion", and "gradation" of "4", "4", and "3", respectively, which are intermediate values. In the drama genre, consequently, the total score is "11", the size selection parameter "default" is selected, and the offset OF is set to "0".

Because of the large amount of camera work, flash lighting, blinking illumination, etc., a music genre is evaluated as having an element "motion" of "7", which is a large value. Because of having no noticeable features in textures and no importance on gradation, the music genre is evaluated as having elements "texture" and "gradation" of "4" and "3", respectively, which are intermediate values. In the music genre, consequently, the total score is "14", the size selection parameter "4×4 preferential" is selected, and the offset OF is set to "−1000".

Because of having a comparatively large amount of motion of performers in, for example, an action game and a large amount of camera work, a variety genre is evaluated as having an element "motion" of "6". Because of having no noticeable features in textures and no importance on gradation, the variety genre is evaluated as having elements "texture" and "gradation" of, "4" and "3", respectively, which are intermediate values. In the variety genre, consequently, the total score is "13", the size selection parameter "4×4 preferential" is selected, and the offset OF is set to "−1000".

Like the drama genre, a movie genre has various types of movies including movies with a comparatively small amount of motion, such as romance movies, and movies with a large amount of motion, such as action movies and sports movies. Like the drama genre, because of having no noticeable features in textures, like the news/news report genre and the drama genre, the movie genre is evaluated as having elements "motion" and "texture" of "4" and "4", respectively, which are intermediate values. Because of having a high importance of gradation, the movie genre is evaluated as having an element "gradation" of "1", which is the lowest value. In the movie genre, consequently, the total score is "9", the size selection parameter "8×8 preferential" is selected, and the offset OF is set to "+1000".

An animation/SFX genre has a large number of line drawings, and may be an animation-SFX combined genre. Animations predominantly contain line drawings with rapid changes in color tone, and have a feature that block noise or mosquito noise is likely to occur due to the rapid changes in color. In contrast, SFX is live action, and involves a small amount of camera work and a small amount of motion, which are greatly different features from those of animations. In the present embodiment, improvement in the quality of animation is prioritized, and a size selection parameter is selected based on the animation. The animation/SFX genre is evaluated as having an element "texture" of "7", which is the largest value, and elements "motion" and "gradation" of, "4" and "3", respectively, which are intermediate values. In the animation/SFX genre, consequently, the total score is "14", the size selection parameter "4×4 preferential" is selected, and the offset OF is set to "−1000".

A documentary/education genre generally includes scenes with slow changes in color, such as nature, landscape, and other scenes. Thus, the documentary/education genre is evaluated as having an element texture of "1". Further, since photography of landscapes and the like rather than photography of humans (performers) is dominant, the amount of motion is small. Thus, the documentary/education genre is evaluated as having an element "motion" of "3". Because of having images of many landscapes, the documentary/education genre has comparatively high importance on gradation in scenes such as sunset, sky, and other scenes, and is evaluated as having an element "gradation" of "2". In the documentary/education genre, the total score is "6", the size selection parameter "8×8 preferential" is selected, and the offset OF is set to "+1000".

A theater/stage genre has various performances including those with a comparatively small amount of motion, such as Rakugo or Japanese comedy stages, and those with a large amount of motion and a large amount of camera work, such as dance and ballet shows. Thus, the theater/stage genre is evaluated as having elements "texture", "motion", and "gradation" of "4", "4", and "3", respectively, which are intermediate values. In the theater/stage genre, consequently, the total score is "11", the size selection parameter "default" is selected, and the offset OF is set to "0".

A hobby/education genre generally includes programs with a comparatively small amount of motion, such as gardening programs, Go-playing programs, and Shogi or Japanese chess playing programs, and many demonstrations are performed with still images. Further, in general, comparatively simple pictures may also be used. Thus, the hobby/education genre is evaluated as having an element "motion" of "2", an element "texture" of "3", which is a value slightly smaller than an intermediate value, and an element "gradation" of "3", which is an intermediate value. In the hobby/education genre, consequently, the total score is "8", the size selection parameter "8×8 preferential" is selected, and the offset OF is set to "+1000".

A welfare genre has various programs including programs with a small amount of motion, such as programs reporting welfare problems, and programs with a large amount of motion, such as historical programs with text broadcasting. Thus, like the news/news report genre and the drama genre, the welfare genre is evaluated as having elements "texture", "motion", and "gradation" of "4", "4", and "3", respectively, which are intermediate values. In the welfare genre, consequently, the total score is "11", the size selection parameter "default" is selected, and the offset OF is set to "0".

Specifically, upon receipt of the EPG information S3 supplied from the digital tuner unit 3 (FIG. 1), the EPG information obtaining unit 31 (FIG. 2) of the image encoding unit 4 supplies the EPG information S3 to a genre information obtaining unit 32. The genre information obtaining unit 32 extracts genre information corresponding to broadcast program content to be recorded from the EPG information S3, and supplies the genre information to a parameter determination unit 33.

The parameter determination unit 33 stores a setting table in which genre information is associated with size selection thresholds DTD_TH. In FIG. 5, the default size selection threshold DCT_TH is "2000", by way of example. That is, when a size selection threshold DTC_TH corresponding to genre information is selected, a value obtained by automatically adding the offset OF corresponding to the size selection parameter to the default size selection threshold DCT_TH is selected. When the size selection threshold DTD_TH corresponding to the genre information is selected, the parameter determination unit 33 supplies the size selection threshold DTC_TH to the block size setting unit 34.

The variance value MB_Var of each macroblock is supplied to the block size setting unit 34 from the variance calculation unit 12. The block size setting unit 34 compares the variance value MB_Var with the size selection threshold DTC_TH.

When the variance value MB_Var is larger than the size selection threshold DTD_TH, the block size setting unit 34 selects DCT blocks of 4×4 pixels, and supplies a size signal indicating the selection of DCT blocks of 4×4 pixels to the orthogonal transformation unit 17. When the variance value MB_Var is less than or equal to the size selection threshold DTD_TH, the block size setting unit 34 selects DCT blocks of 8×8 pixels, and supplies a signal indicating the selection of DCT blocks of 8×8 pixels to the orthogonal transformation unit 17.

The orthogonal transformation unit 17 executes DCT processing on the difference data D1 at the block size indicated by the size signal supplied from the block size setting unit 34.

Accordingly, the image encoding unit 4 evaluates the 4×4-priority elements indicating the priority of DCT blocks of 4×4 pixels in accordance with the occurrence probability of noise in the image data S4, which is contained for each genre of broadcast program content. The image encoding unit 4 causes the evaluation of the 4×4-priority elements to be reflected in the block size in the DCT processing.

Therefore, the image encoding unit 4 can cause not only the variance value MB_Var of the image data S4 but also the occurrence probability of noise, which may not necessarily be recognized from the variance value MB_Var, to be reflected in the block size of the DCT blocks. Thus, the image encoding unit 4 can set a block size suitable for the image data S4, and can increase the image quality of the bit stream S6.

The series of encoding and block size setting processes described above can be executed by hardware or software. When the series of encoding and the block size setting processes are implemented by software, the image encoding unit 4 is formed in a virtual manner in a central processing unit (CPU) and a random access memory (RAM). Then, when a block size setting program stored in a read-only memory (ROM) is developed on the RAM, the encoding process is executed.

1-4. Block Size Setting Process Routine

Figure 6:
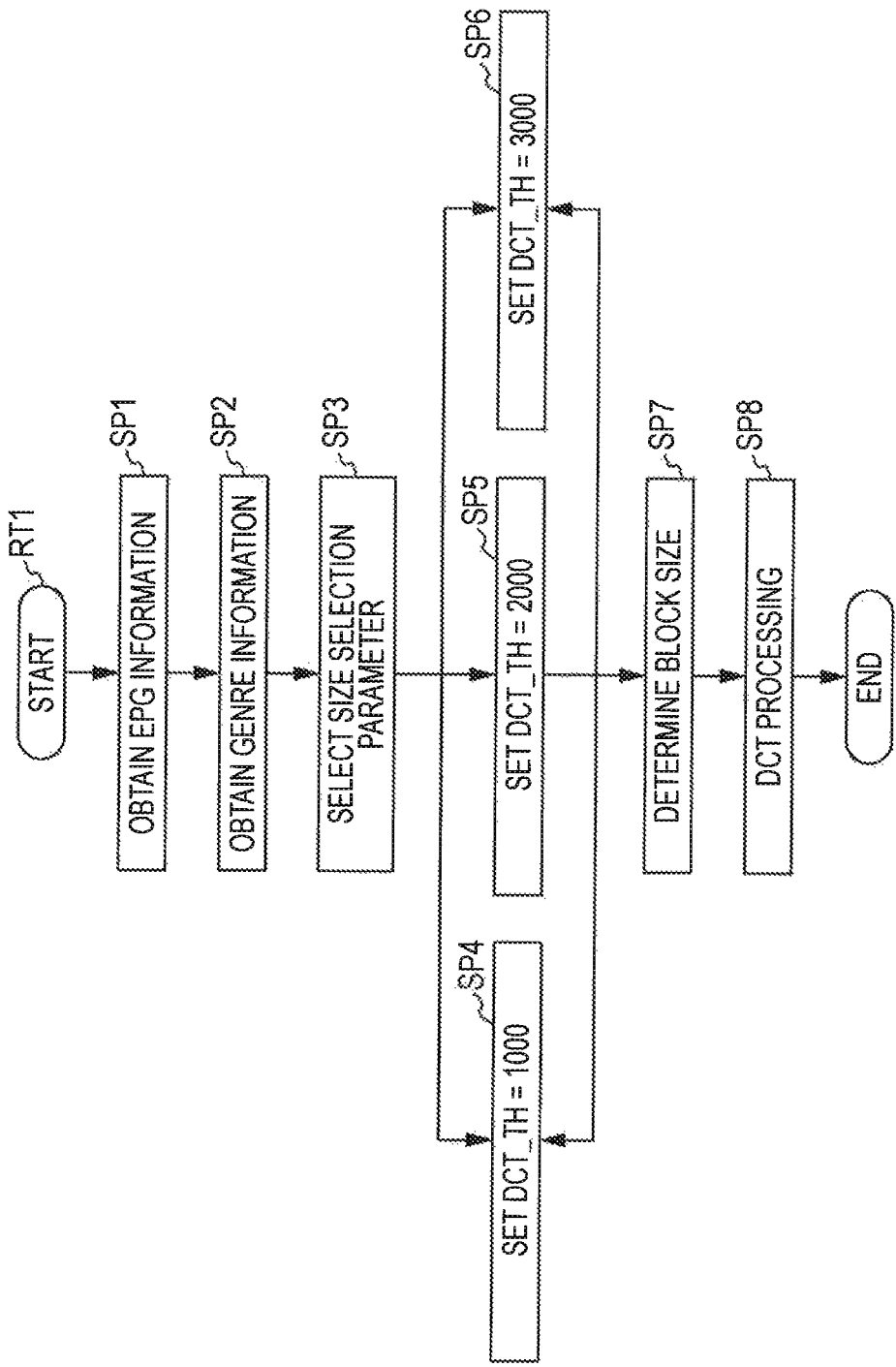
FIG. 6 is a flowchart describing a block size setting process procedure.

A block size setting process routine RT1 executed in accordance with a block size setting process program will now be described with reference to a flowchart of FIG. 6.

The image encoding unit 4 starts the block size setting process routine RT1. When the EPG information S3 and the image data S4 are supplied in step SP1, the image encoding unit 4 proceeds to step SP2.

In step SP2, the image encoding unit 4 obtains genre information from the EPG information S3. Then, the image encoding unit 4 proceeds to step SP3.

In step S3, the image encoding unit 4 selects a size selection parameter corresponding to the genre information. When the size selection parameter "4×4 preferential" is selected, the image encoding unit 4 proceeds to step SP4. When the size selection parameter "default" is selected, the image encoding unit 4 proceeds to step SP5. When the size selection parameter "8×8 preferential" is selected, the image encoding unit 4 proceeds to step SP6. In the first embodiment, the size selection threshold DCT_TH corresponding to a size selection parameter is selected, thus allowing the size selection parameter to be selected indirectly.

In step SP4, the image encoding unit 4 sets the size selection threshold DCT_TH to "1000". Then, the image encoding unit 4 proceeds to step SP7.

In step SP5, the image encoding unit 4 sets the size selection threshold DCT_TH to "2000". Then, the image encoding unit 4 proceeds to step SP7.

In step SP6, the image encoding unit 4 sets the size selection threshold DCT_TH to "3000". Then, the image encoding unit 4 proceeds to step SP7.

In step SP7, the image encoding unit 4 compares the size selection threshold DCT_TH set in any of steps SP4 to SP6 with the variance value MB_Var of the macroblock to determine a block size. Then, the image encoding unit 4 proceeds to step SP8.

In step SP8, the image encoding unit 4 executes DCT processing on the difference data D1 at the block size determined in step SP7. Then, the image encoding unit 4 proceeds to an end step, and the process ends.

1-5. Operation And Advantageous Effects

In the above configuration, the image encoding unit 4 in the image processing apparatus 1 receives image data S4 of broadcast program content serving as program content and genre information regarding the broadcast program content, and selects a size selection parameter for causing the genre information to be reflected in the block size. The image encoding unit 4 selects the size selection threshold DCT_TH corresponding to the size selection parameter, thereby determining a block size used for orthogonal transformation based on the size selection parameter. The image encoding unit 4 performs orthogonal transformation on the difference data D1, which is data to be processed based on the image data S4, at the determined block size.

Therefore, the image encoding unit 4 can cause the features of the image data S4, which correspond to the description of the broadcast program content indicated by the genre information, to be reflected in the determined block size. Thus, DCT processing serving as orthogonal transformation can be executed using an appropriate block size.

The image encoding unit 4 compares an index value indicating a feature of a pixel value of the image data S4 with the block selection threshold DHC_TH selected in accordance with the size selection parameter, and selects a block size used for DCT transformation, thus causing the genre information to be reflected in the block size.

Thus, the image encoding unit 4 can cause not only the features of the image data S4 in accordance with the description of the broadcast program content but also the features of the pixel values to be reflected in the determined block size. That is, the image encoding unit 4 can cause the features of pixel values that can be recognized by the analysis of the image data S4 to be reflected in the determination of a block size, and can further cause the features of the image data S4 that may not necessarily be recognized by the analysis of the image data S4 and that correspond to the description of the broadcast program content to be reflected in the determination of a block size. Consequently, the image encoding unit 4 can more appropriately select a block size.

The image encoding unit 4 employs a variance value MB_Var that represents the variance of each macroblock, which is the unit of encoding, as a feature of pixel values.

Accordingly, the image encoding unit 4 can cause the occurrence probability of noise that can be recognized by the analysis of the image data S4 to be reflected in the determination of a block size. Thus, a more appropriate block size can be selected.

The image encoding unit 4 determines a block size from a predetermined first block size of DCT blocks of 4×4 pixels and a second block size of DCT blocks of 8×8 pixels larger than the first block size of DCT blocks of 4×4 pixels. When noise reduction is to be prioritized, the image encoding unit 4 reduces the block selection threshold DCT_TH, thereby preferentially using the size of DCT blocks of 4×4 pixels as the block size used for DCT transformation. When encoding efficiency is to be prioritized, the image encoding unit 4 increases the block selection threshold DCT_TH, thereby preferentially using the size of DCT blocks of 8×8 pixels as the block size used for DCT transformation.

Therefore, when it is not necessary to reduce noise, the image encoding unit 4 prioritizes encoding efficiency to preferentially use DCT blocks of 8×8 pixels, and can thus increase encoding efficiency without reducing image quality.

When gradation is to be emphasized, the image encoding unit 4 increases the block selection threshold DCT_TH, thereby preferentially using the size of DCT blocks of 8×8 pixels as the block size used for DCT transformation.

Thus, the image encoding unit 4 can increase quality of gradation in broadcast program content having scenes with a high importance of gradation, such as movies.

When the genre information indicates the sports genre, the image encoding unit 4 reduces the block selection threshold DCT_TH, thereby preferentially using the size of DCT blocks of 4×4 pixels as the block size used for DCT transformation.

Thus, the image encoding unit 4 can increase image quality with high priority on noise reduction in broadcast program content belonging in the sports genre in which the amount of motion is large and in which the occurrence probability of noise is high.

When the genre information indicates the animation/SFX genre, the image encoding unit 4 reduces the block selection threshold DCT_TH, thereby preferentially using the size of DCT blocks of 4×4 pixels as the block size used for DCT transformation.

Thus, the image encoding unit 4 can increase image quality with high priority on noise reduction in broadcast program content belonging to the animation genre in which the use of line drawings is dominant and in which the occurrence probability of noise is high.

When the genre information indicates the music genre, the image encoding unit 4 reduces the block selection threshold DCT_TH, thereby preferentially using the size of DCT blocks of 4×4 pixels as the block size used for DCT transformation.

Thus, the image encoding unit 4 can increase image quality with high priority on noise reduction in broadcast program content belonging to the music genre in which the amount of motion is large because of the use of flash lighting and illumination.

When the genre information indicates the variety genre, the image encoding unit 4 reduces the block selection threshold DCT_TH, thereby preferentially using the size of DCT blocks of 4×4 pixels as the block size used for DCT transformation.

Thus, the image encoding unit 4 can increase image quality with high priority on noise reduction in broadcast program content belonging to the variety genre in which the amount of motion is large and in which the occurrence probability of noise is high.

When the genre information indicates the documentary/education genre, the image encoding unit 4 increases the block selection threshold DCT_TH, thereby preferentially using the size of DCT blocks of 8×8 pixels as the block size used for DCT transformation.

Thus, the image encoding unit 4 can increase encoding efficiency while maintaining image quality in broadcast program content belonging to the documentary/education genre in which a large number of low-frequency images are included and in which the occurrence probability of noise is low.

When the genre information indicates the hobby/education genre, the image encoding unit 4 increases the block selection threshold DCT_TH, thereby preferentially using the size of DCT blocks of 8×8 pixels as the block size used for DCT transformation.

Thus, the image encoding unit 4 can increase encoding efficiency while maintaining image quality in broadcast program content belonging to the hobby/education genre in which the amount of motion is small and in which the occurrence probability of noise is low.

The image encoding unit 4 encodes image data in accordance with the H.264/AVC scheme. The orthogonal transformation unit 17 uses the difference data D1, which represents the difference between pixel values, as image data to be subjected to DCT processing, and executes DCT processing as orthogonal transformation.

Thus, the image encoding unit 4 can encode the image data S4 of the broadcast program content at a high compression ratio.

The image encoding unit 4 evaluates which of noise reduction and encoding efficiency to prioritize on the basis of a plurality of 4×4-priority elements serving as priority elements each of which represents the occurrence probability of noise of the image data S4. The 4×4-priority elements are weighted with individual values.

Thus, the image encoding unit 4 can appropriately evaluate the occurrence probability of noise on the basis of a plurality of factors while taking the importance of the plurality of factors into account.

With the above configuration, the image encoding unit 4 selects a size selection parameter to be reflected in the block size using the features of the image data S4 in accordance with the description of the broadcast program content indicated by the genre information. The image encoding unit 4 causes the size selection parameter to be reflected in the block size used for DCT processing.

Thus, the image encoding unit 4 can cause broadcast program content, which may not necessarily be recognized only by the analysis of the image data S4, to be reflected in the block size, and can appropriately determine the priority of noise reduction or encoding efficiency. According to an embodiment of the present invention, therefore, an image processing apparatus and an image processing method which enable increase in image quality can be achieved.

2—Second Embodiment 2-1. Block Size Setting Process Using Information Other than Genre Information In a second embodiment, portions corresponding to those of the first embodiment illustrated in FIGS. 1 to 6 are represented by the same reference numerals, and descriptions thereof will be omitted. The second embodiment is different from the first embodiment in that a block size is changed using not only genre information but also information other than the genre information included in the EPG information S3.

The EPG information S3 includes, in addition to genre information, broadcast station information indicating the broadcast station that distributes the broadcast program content, event information that describes the broadcast program content, and other suitable information.

The broadcast program content is generally captured and edited in a distributor, that is, a broadcast station, and tends to have different levels of noise included in the image data S4, due to the difference in equipment or technique used, depending on the broadcast station. Encoding efficiency may be prioritized for image data S4 based on a broadcast signal Si distributed from a broadcast station that tends to distribute broadcast program content having less noise. Conversely, noise reduction may be prioritized for image data S4 based on a broadcast signal S1 distributed from a broadcast station that tends to distribute broadcast program content having much noise.

Therefore, an image encoding unit (not illustrated in the figures) according to the second embodiment (hereinafter referred to as an "image encoding unit 104") is configured to cause broadcast station information to be reflected in a size selection parameter.

Event information directly represents the broadcast program content. For example, when the event information includes text such as "live broadcasting", "on-the-spot broadcasting", or "live video", at least a main portion in the broadcast program content is possibly broadcast live.

In general, recorded broadcast program content may be distributed with noise reduced in advance by certain image processing. Live broadcast content, on the other hand, usually contains more noise because of insufficient time to perform such modifications. Thus, broadcast program content that is mainly broadcast live has a high occurrence probability of noise, and it is desirable that noise reduction be prioritized.

Further, when event information corresponding to broadcast program content belonging to genres other than the sports genre, such as the movie genre, the drama genre, and the hobby/education genre, contains the name of a sport, at least a main part of the broadcast program content may possibly contain a scene of the sport. In this case, the occurrence probability of noise is high, and it is desirable that noise reduction be prioritized.

When the event information about broadcast program content belonging to the documentary/education genre includes the geographic name of a place with a great nature spot or a historic building or includes a word indicating a place with a great nature spot or a historic building, at least a main part of the broadcast program content may possibly contain a scene of the great nature spot or historic building. Examples of the geographic name of a place with a great nature spot or a historic building include "the Grand Canyon" and "the Great Barrier Reef", and examples of the word indicating a place with a great nature spot or a historic building include "coral reef", "beech virgin forest", "jungle", "world heritage", and "ancient city". Such broadcast program content has low occurrence probability of noise, and it is desirable that encoding efficiency be prioritized.

Thus, when the event information includes such keywords representing visual features of image data S4 (hereinafter referred to as "feature keywords"), the image encoding unit 104 causes the feature keywords to be reflected in the size selection parameter.

When the EPG information S3 is supplied from the EPG information obtaining unit 31, a genre information obtaining unit (not illustrated in the figures) corresponding to the genre information obtaining unit 32 (hereinafter referred to as a "genre information obtaining unit 132") extracts genre information and broadcast station information corresponding to the broadcast program content that is currently being recorded from the EPG information S3, and supplies the extracted genre information and broadcast station information to a parameter determination unit (not illustrated in the figures) corresponding to the parameter determination unit 33 (hereinafter referred to as a "parameter determination unit 133").

The genre information obtaining unit 132 stores a list of feature keywords representing visual features of the image data S4. The genre information obtaining unit 132 searches for a feature keyword from the event information corresponding to the broadcast program content that is currently being recorded within the EPG information S3. When the event information includes the feature keyword, the genre information obtaining unit 132 supplies the feature keyword to the parameter determination unit 133 together with the genre information and the broadcast station information.

The parameter determination unit 133 stores a score table in which total scores are associated with genre information instead of using a setting table in which size selection thresholds DCT_TH (FIG. 5) are associated with genre information. Further, the parameter determination unit 133 stores an additional coefficient table in which, as illustrated in FIG. 7, broadcast station information, feature keywords, and additional coefficients are associated with one another.

The parameter determination unit 133 selects a total score corresponding to the genre information in accordance with the score table. The parameter determination unit 133 further selects an additional coefficient corresponding to the broadcast station information and feature keyword supplied from the genre information obtaining unit 132 in accordance with the additional coefficient table.

When the genre information indicates the sports genre, the total score has been determined on the assumption that scenes of sports are included, and the score table does not apply. When the name of a sport is supplied, the parameter determination unit 133 checks the genre information, and selects an additional coefficient only when the genre information does not indicate the sports genre.

For the name of a nature spot, similarly, when the geographic name of a place with a great nature spot or a historic building or a word indicating a place with a great nature spot or a historic building is supplied, the parameter determination unit 133 checks the genre information, and selects an additional coefficient only when the genre information does not indicate the documentary/education genre.

The parameter determination unit 133 multiplies the selected total score by the corresponding additional coefficient, and calculates a resulting multiplied score. For example, the genre information indicates the documentary/education genre, the broadcast station information indicates content "H", and the feature keyword "live broadcasting" is supplied. In this case, the total score "6" is multiplied by "0.9" for the content "H" and "1.2" for the feature keyword "live broadcasting". Consequently, the multiplied score is given by 6×0.9×1.2=6.48. Further, when no feature keywords are supplied, the parameter determination unit 133 multiplies the total score corresponding to the genre information only by the additional coefficient corresponding to the broadcast station information.

The parameter determination unit 133 has five levels of offsets OF, namely, "−2000", "−1000", "0", "+1000", and "+2000", and selects one offset OF in accordance with the resulting score. In the present embodiment, the offsets OF represent numerical values of size selection parameters.

The parameter determination unit 133 selects the offset OF "−2000" when the multiplied score is "less than 7.0". The parameter determination unit 133 selects the offset OF "−1000" when the multiplied score is "greater than or equal to 7.0 and less than or equal to 10.0". The parameter determination unit 133 selects the offset OF "0" when the multiplied score is "greater than or equal to 10.0 and less than or equal to 13.0". The parameter determination unit 133 selects the offset OF "+1000" when the multiplied score is "greater than 13.0 and less than 15.0". parameter determination unit 133 selects the offset OF "+2000" when the multiplied score is "greater than or equal to 15.0".

The parameter determination unit 133 supplies the selected offset OF to a block size setting unit (not illustrated in the figures) corresponding to the block size setting unit 34 (hereinafter referred to as a "block size setting unit 134"). The block size setting unit 134 adds the supplied offset OF to the default value "2000", thereby calculating the size selection threshold DCT_TH. The block size setting unit 134 compares the size selection threshold DCT_TH with the variance value MB_Var supplied from the variance calculation unit 12.

Accordingly, the image encoding unit 104 calculates a multiplied score, thereby determining a priority of noise reduction and maintenance of resolution in the image data S4 using, in addition to genre information, broadcast station information and feature keywords.

Thus, the image encoding unit 104 can determine a priority of noise reduction and encoding efficiency using the occurrence probability of noise in the image data S4, which may not necessarily be recognized from only genre information, and can more appropriately select a block size.

2-2. Operation and Advantageous Effects

In the above configuration, the image encoding unit 104 receives event information that describes broadcast program content included in the EPG information S3. When the event information includes a feature keyword indicating the occurrence probability of noise in image data, the image encoding unit 104 causes the feature keyword to be reflected in the determination of a block size.

Thus, the image encoding unit 104 can determine a block size using a feature keyword that directly represents the broadcast program content, and can therefore more appropriately set a block size.

The image encoding unit 104 receives broadcast station information indicating the broadcast station that has distributed the broadcast program content, and causes the broadcast station information indicating the broadcast station that has distributed the broadcast program content to be reflected in the determination of a block size.

Thus, the image encoding unit 104 can cause the occurrence probability of noise for each broadcast station to be reflected in the determination of a block size, and can therefore more appropriately set a block size.

The image encoding unit 104 determines a size selection threshold DCT_TH in accordance with the primary-classification genre to which the broadcast program content belongs. When the sub-classification genre to which the broadcast program content belongs is exceptional for the occurrence probability of noise indicated by the primary-classification genre, the image encoding unit 104 causes the exceptional sub-classification genre to be reflected in the determination of a block size regardless of the size selection threshold DCT_TH corresponding to the primary-classification genre.

Thus, the image encoding unit 104 can cause the broadcast program content to be appropriately reflected in the determination of a block size, and can more appropriately set a block size.

With the above configuration, the image encoding unit 104 causes a feature keyword included in the event information to be reflected in the determination of a block size, thus allowing the occurrence probability of noise in the image data S4 to be more appropriately reflected in the block size. Consequently, the image encoding unit 104 can appropriately adjust the balance between noise reduction and encoding efficiency, and can increase image quality in the bit stream S6.

Other Embodiments

In the first and second embodiments described above, the image encoding unit determines a size selection parameter in accordance with the primary-classification genre to which broadcast program content belongs, by way of example. The present invention is not to be limited thereto, and, in an embodiment, for example, a size selection parameter may be determined in accordance with the sub-classification genre to which broadcast program content belongs, which is indicated by genre information. In this case, the image encoding unit stores a setting table in which sub-classification genres are associated with size selection parameters, and selects a size selection parameter in accordance with the sub-classification genre. Then, for example, the image encoding unit uses a size selection threshold DCT_TH corresponding to the size selection parameter.

Thus, the image encoding unit enables more detailed classification of broadcast program content, and therefore more appropriately select a size selection parameter.

The image encoding unit may also have a setting table (FIG. 8) in which exceptional sub-classifications indicating that the sub-classification genre to which broadcast program content belongs is exceptional for the occurrence probability of noise indicated by primary-classification genre to which the broadcast program content belongs are associated with size selection parameters. When the sub-classification genre to which broadcast program content belongs is an exceptional sub-classification genre, the image encoding unit determines a size selection parameter corresponding to the exceptional sub-classification genre as the size selection parameter of the broadcast program content regardless of the size selection parameter corresponding to the primary-classification genre to which broadcast program content belongs.

The image encoding unit preferentially uses the block size of 8×8 pixels when the sub-classification genre is "politics & congress/debate & conference" ("news/news report"), "lifestyle/food & cooking/health & medicine" ("entertainment & gossip"), "classics & opera" ("music"), "travel & tour" ("variety"), "SFX" ("animation/SFX"), "historical & travel/interview & discussion" ("documentary/education"), or "comedy & sitcom" ("theater/stage"). The image encoding unit preferentially uses the block size of 4×4 pixels when the sub-classification genre is "animation" ("movie"), "sports" ("documentary/education"), or "dance & ballet" ("theater/stage"). In the above examples, the bracketed words indicate primary-classification genres to which sub-classification genres belong.

Thus, the image encoding unit can execute DCT processing on broadcast program content belonging to an exceptional sub-classification genre having a tendency different from the corresponding primary-classification genre at an appropriate block size.

Further, in the first embodiment described above, a size selection parameter is selected in accordance with genre information. The present invention is not to be limited thereto, and, in an embodiment, time information indicating the current time may further be received and the time information may be reflected in a block size. For example, in the midnight time zone in which low-quality video is generally distributed, the quality of images tends to be low. Thus, noise reduction may be prioritized and the size of DCT blocks of 4×4 pixels may be preferentially used.

Figure 9:
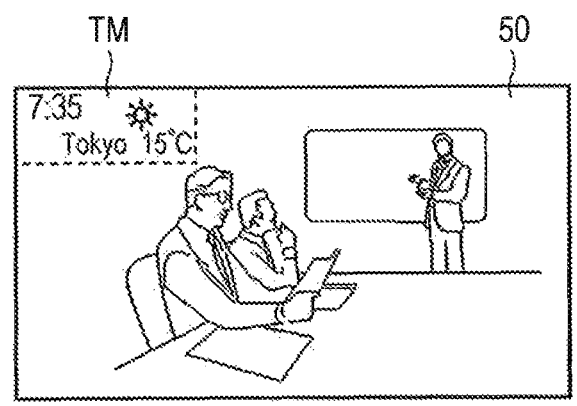
FIG. 9 is a schematic diagram illustrating an exemplary filter characteristic changing process using time information.

Further, as illustrated in FIG. 9, when the time indicated by the time information time is within a designated period of time determined in advance (for example, from 5:00 am to 8:59 am), the image encoding unit may preferentially use the size of DCT blocks of 4×4 pixels for a time display area TM where the current time is displayed. In this case, the image encoding unit determines a size selection parameter for an area other than the time display area TM using a method similar to that of the first embodiment.

Thus, the image encoding unit can reduce noise in the time display area TM where text information is displayed in a frame image 50, and can therefore appropriate remove noise that is likely to occur around the text information. This avoids the image encoding unit to give a user an impression of low quality of an entire image because text information is unclear due to noise.

Furthermore, in addition to the example illustrated in FIG. 9, for example, the size of DCT blocks of 4×4 pixels may be preferentially used for a superimposition area where scenes are superimposed with text in genres of content having a large amount of superimposed text, such as variety shows, or for the entirety of a frame image.

Further, in the first and second embodiments described above, the orthogonal transformation unit 17 provides switching between DCT blocks of 4×4 pixels and DCT blocks of 8×8 pixels. The present invention is not to be limited thereto, and there is no limitation on the size of DCT blocks to be switched. For example, DCT blocks of 16×16 pixels or 32×32 pixels may also be used. In addition, three or more sizes may be used as block sizes, and a block size may be selected in accordance with a plurality of selection thresholds.

Furthermore, in the first and second embodiments described above, DCT processing is used as orthogonal transformation, by way of example. The present invention is not to be limited thereto, and, in an embodiment, a variety of orthogonal transformation processes such as wavelet transformation may be used.

In the first and second embodiments described above, furthermore, the variance value MB_Var is used as an index that represents features of pixels, by way of example. The present invention is not to be limited thereto, and a variety of indices may be used. An index may not necessarily be calculated for each macroblock as the unit of encoding, but may be calculated in units of various sizes, for example, in units of 8×8 pixels or 32×32 pixels. In the embodiments of the present invention, there is no limitation on the default value which may be set to any value. There is no limitation on the number of offsets OF, the values of the offsets OF, and the method for calculating the offsets OF. For example, an offset OF may be calculated by multiplying a total score as a size selection parameter by a predetermined coefficient.

Furthermore, in the first and second embodiments described above, the embodiments of the present invention are applied to the distribution of terrestrial digital broadcasting. The present invention is not to be limited thereto, and the embodiments of the present invention may be applied to, for example, various types of program content such as program content stream-distributed via the Internet and program content distributed on-demand. Further, the EPG information S3 may not necessarily be obtained at the same time as the broadcast signal S1, and may be separately obtained via a network such as the Internet. In this case, more detailed genre information can be acquired. A setting table or a score table corresponding to such genre information may be stored, thus enabling a block size to be set in accordance with more detailed classifications.

In the first and second embodiments described above, an encoding process is executed in accordance with the AVC/H.264 scheme. The present invention is not to be limited thereto, and the embodiments of the present invention can also be applied to any encoding scheme that uses a filter capable of reducing noise caused by encoding.

Furthermore, in the first embodiment described above, a 4×4-priority element is evaluated as a priority element to evaluate the priority of noise reduction, by way of example. The present invention is not to be limited thereto, and the priority of encoding efficiency may be evaluated. Further, there is no limitation on the number of priority elements, and one or more desired priority elements may be used.

Further, in the second embodiment described above, a size selection parameter selected in accordance with genre information is multiplied by an additional coefficient selected in accordance with broadcast station information and a feature keyword, by way of example. The present invention is not to be limited thereto, and it is to be understood that either of or both the broadcast station information and the feature keyword may be reflected in the determination of a block size. For example, an additional coefficient selected in accordance with the broadcast station information and the feature keyword may be added. Alternatively, an additional coefficient may be selected in accordance with one of the broadcast station information and the feature keyword. Furthermore, in an embodiment of the present invention, either of or both the broadcast station information and the feature keyword may be reflected in the determination of a block size without using genre information. In this case, a size selection parameter, the size selection threshold DTD_TH corresponding thereto, or the like is selected from a setting table in which one of the broadcast station information and the feature keyword or both are associated with size selection parameters. Alternatively, a size selection threshold DCT_TH illustrated in FIG. 5 may be selected as a size selection parameter, and may be multiplied by an additional coefficient to determine the selection threshold DCT_TH to be actually used.

Furthermore, in the foregoing embodiments, an encoding program, a block size setting program, and the like are stored in advance in a ROM, a hard disk drive, or the like, by way of example. The present invention is not to be limited thereto, and the above programs may be installed into a flash memory or the like from an external storage medium such as a memory stick (which is a registered trademark of Sony Corporation). Further, the block size setting program and the like may be obtained from outside via a wireless local area network (LAN) based on the universal serial bus (USB), Ethernet (registered trademark), Institute of Electrical and Electronics Engineers (IEEE) 802.11a/b/g, or any other suitable standard, and may further be distributed via terrestrial digital television broadcasting or broadcasting satellite (BS) digital television broadcasting.

In the embodiments described above, the image encoding unit 4 serving as an encoding apparatus is configured using a receiving unit corresponding to the screen rearrangement buffer 11 and the EPG information obtaining unit 31, a selection unit and a determination unit corresponding to the parameter determination unit 33, and an orthogonal transformation unit corresponding to the orthogonal transformation unit 17. An image processing apparatus according to an embodiment of the present invention may at least include a receiving unit, a selection unit, a determination unit, and an orthogonal transformation unit, and may be configured only using, for example, the image encoding unit 4. Alternatively, an encoding apparatus according to an embodiment of the present invention may be configured using a receiving unit, a selection unit, a determination unit, and an orthogonal transformation unit, which may have other various configurations.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for processing video content, comprising:
   a determination unit configured to determine a block size based on genre information related to the video content, the block size being used for orthogonal transformation; and
   an orthogonal transformation unit configured to perform orthogonal transformation on image data of the video content using the block size determined by the determination unit.

2. The processing apparatus server of claim 1, further comprising:
   a selection unit configured to select a size selection parameter based on the genre information, wherein the block size is determined based on the size selection parameter.

3. The image processing apparatus of claim 2, wherein:
   the determination unit is configured to determine the block size by comparing an index value indicating a feature of a pixel value of the image data with a block selection threshold selected in accordance with the size selection parameter.

4. The image processing apparatus of claim 3, wherein:
   the index value is a variance value indicating variance of units of encoding.

5. The image processing apparatus of claim 3, wherein:
   the determination unit is configured to use a predetermined first block size as the block size used for Orthogonal transformation, among the first block size and a second block size that is larger than the first block size, by reducing the block selection threshold when noise reduction is to be prioritized, and
   the determination unit is configured to use the second block size as the block size used for orthogonal transformation by increasing the block selection threshold when encoding efficiency is to be prioritized.

6. The image processing apparatus of claim 5, wherein:
   the determination unit is configured to use the second block size as the block size used for orthogonal transformation by increasing the block selection threshold when gradation is to be emphasized.

7. The image processing apparatus of claim 5, wherein:
   the determination unit is configured to use the first block size as the block size used for orthogonal transformation by reducing the block selection threshold when the genre information indicates a sport genre, an animation/SFX genre, a music genre, or a variety genre.

8. The image processing apparatus of claim 5, wherein:
   the determination unit is configured to use the second block size as the block size used for orthogonal transformation by increasing the block selection threshold when the genre information indicates a documentary/education genre or a hobby/education genre.

9. The image processing apparatus of claim 5, wherein:
   the image processing apparatus is configured to encode the image data in accordance with H.264/Advanced Video Coding, and
   wherein the Orthogonal transformation unit is configured to use difference data representing a difference between pixel values as image data to be subjected to orthogonal transformation, and execute Discrete Cosine Transform (DCT) processing as the orthogonal transformation on the image data.

10. The image processing apparatus of claim 3, wherein:
    the determination unit is configured to determine the block selection threshold in accordance with a primary-classification genre to which the video content belongs, and when a sub-classification genre to which the video content belongs is associated with an occurrence probability of noise different from that of the primary-classification genre, the determination unit is configured to determine the block size based on the sub-classification genre regardless of a size selection threshold corresponding to the primary-classification genre.

11. The image processing apparatus of claim 4, wherein:
    the determination unit is configured to determine the block size based on a sub-classification genre to which the video content belongs, which is indicated by the genre information.

12. The image processing apparatus of claim 4, wherein:
    the determination unit is further configured to determine the block size based on time information indicating a current time.

13. The image processing apparatus of claim 12, wherein:
    when the current time indicated by the time information is within a predetermined designated period of time, the determination unit is configured to use, for a time display area where the current time is displayed, the first block size as the block size used for orthogonal transformation.

14. The image processing apparatus of claim 1, wherein:
the determination unit is further configured to determine the block size based on a feature keyword, when an event information that describes the video content includes the feature keyword, the feature keyword indicating an occurrence of probability of noise of the image data.

15. The image processing apparatus of claim 1, wherein:
the determination unit is further configured to determine the block size based on broadcast station information, indicating a broadcast station that has distributed the video content.

16. An image processing method for processing video content, comprising:
   determining a block size based on genre information related to the video content, the block size being used for orthogonal transformation; and
   performing orthogonal transformation on an image data of the video content using the determined block size.

17. The image processing method of claim 16, further comprising:
   selecting a size selection parameter based on the genre information, wherein the block size is determined based on the size selection parameter.

18. The image processing method of claim 17, wherein:
the block size is determined by comparing an index value indicating a feature of a pixel value of the image data with a block selection threshold selected in accordance with the size selection parameter.

19. The image processing method of claim 18, wherein:
the index value is a variance value indicating variance of units of encoding.

20. A non-transitory computer-readable storage medium having a set of computer-executable instructions stored therein which causes a computer processor to execute an image processing method comprising:
   determining a block size based on genre information related to video content, the block size being used for orthogonal transformation; and
   performing orthogonal transformation on image data of the video content using the determined block size.

* * * * *